United States Patent
Roesmann (10) Patent No.: US 8,044,528 B2
(45) Date of Patent: Oct. 25, 2011

(54) WIND POWER FACILITY HAVING ACTIVATION CIRCUIT FOR A SPEED-LIMITED AND VOLTAGE-SOURCE-PROTECTIVE OPERATION OF A PITCH-DRIVE SERIES-WOUND MOTOR AT GENERATOR TORQUES

(75) Inventor: Tobias Roesmann, Dortmund (DE)

(73) Assignee: Moog Unna GmbH, Unna (DE)

( * ) Notice: Subject to any disclaimer, the term of this patent is extended or adjusted under 35 U.S.C. 154(b) by 518 days.

(21) Appl. No.: 12/250,819

(22) Filed: Oct. 14, 2008

(65) Prior Publication Data

US 2009/0121485 A1    May 14, 2009

(30) Foreign Application Priority Data

Nov. 8, 2007  (DE) .......................... 10 2007 053 613

(51) Int. Cl.
*H02P 7/28* (2006.01)
*F03D 7/02* (2006.01)

(52) U.S. Cl. ........................................................ 290/44
(58) Field of Classification Search .............. 322/59, 322/67; 290/44
See application file for complete search history.

(56) References Cited

U.S. PATENT DOCUMENTS 3,876,920 A  *  4/1975  Meissen et al. .............. 318/370
4,186,333 A  *  1/1980  Kremer .......................... 318/376
4,965,477 A  * 10/1990  Stadler et al. ................. 310/114

FOREIGN PATENT DOCUMENTS

| DE | 1282272 B | | 11/1968 |
|---|---|---|---|
| DE | 4240972 A1 | | 6/1994 |
| DE | 102004005169 | * | 3/2005 |
| DE | 102004005169 B3 | | 11/2005 |

OTHER PUBLICATIONS

"European Application Serial No. 08164152.4, Search Report mailed Feb. 23, 2009", 6 pgs.

* cited by examiner

*Primary Examiner* — Burton Mullins
(74) *Attorney, Agent, or Firm* — Schwegman, Lundberg & Woessner, P.A.

(57) ABSTRACT

A wind power facility includes an activation circuit for a speed-limited and voltage-source-protective operation of a pitch-drive series-wound motor at generator torques. The activation circuit can comprise a pitch-drive series-wound motor, in which armature winding and exciter winding are connectable separately from one another, a load resistor $R_{II}$, which is switched essentially in series to the exciter winding and parallel to the armature winding, and a voltage source, such as a battery or accumulator. A first terminal contact of the armature winding can be connected via a first power converter component to a first terminal contact of the exciter winding and a first terminal contact of the load resistor, and the first terminal contact of the armature winding can be connected via a second power converter component to a second terminal contact of the exciter winding. The first power converter component can transmit in motor operation and block in generator operation, and the second power converter component can transmits in generator operation and block in motor operation.

11 Claims, 4 Drawing Sheets

WIND POWER FACILITY HAVING ACTIVATION CIRCUIT FOR A SPEED-LIMITED AND VOLTAGE-SOURCE-PROTECTIVE OPERATION OF A PITCH-DRIVE SERIES-WOUND MOTOR AT GENERATOR TORQUES

RELATED APPLICATION

The present application claims priority under 35 U.S.C. 119 to German Utility Application No. 10 2007 053 613.7, filed Nov. 8, 2007, which is hereby incorporated by reference.

TECHNICAL FIELD

This document relates to a wind power facility having an activation circuit for a speed-limited and voltage-source-protective operation of a pitch-drive series-wound motor at generator torques, and more particularly, but not by way of limitation to a wind power facility that comprises a series-wound motor having armature and exciter windings connectable separately from one another, a load resistor $R_{II}$ connected essentially in series to the exciter winding and parallel to the armature winding, as well as a voltage source, such as a battery or accumulator.

BACKGROUND

In general, exciter and armature windings are connected in series in series-wound motors, which are also called series motors. Exciter current and armature current and thus also the magnetic fields caused thereby thus change their direction synchronously, so that a feed using alternating current is possible in fixed rotational direction. The exciter winding is typically low-resistance, in contrast to the shunt-wound motor. The speed of series-wound motors is strongly load-dependent. If the output torque drops, e.g., in case of idle, the speed of the armature rises because of the low current and the field attenuation accompanying it. This can continue until the motor "runs away", which means that the speed rises ever further and can result in destruction of the motor because of the resulting centrifugal forces. Therefore, series-wound motors are generally operated using a base load, such as motor fans, gears, or a load resistor connected in parallel to the armature, to counteract a field attenuation of the exciter magnetic field. Two approaches for preventing a series-wound motor from running away can include: on the one hand an artificial increase of the mechanical load, for example, by gears or mechanical fans, on the other hand by electrically connecting a load resistor in parallel to the armature winding, so that the exciter coil also has current flowing through it in the event of decreasing armature current to maintain the exciter magnetic field. A type of hybrid motor is provided by circuitry, which connects the properties of a series-wound and a shunt-wound motor with one another.

OVERVIEW

Figure 1:
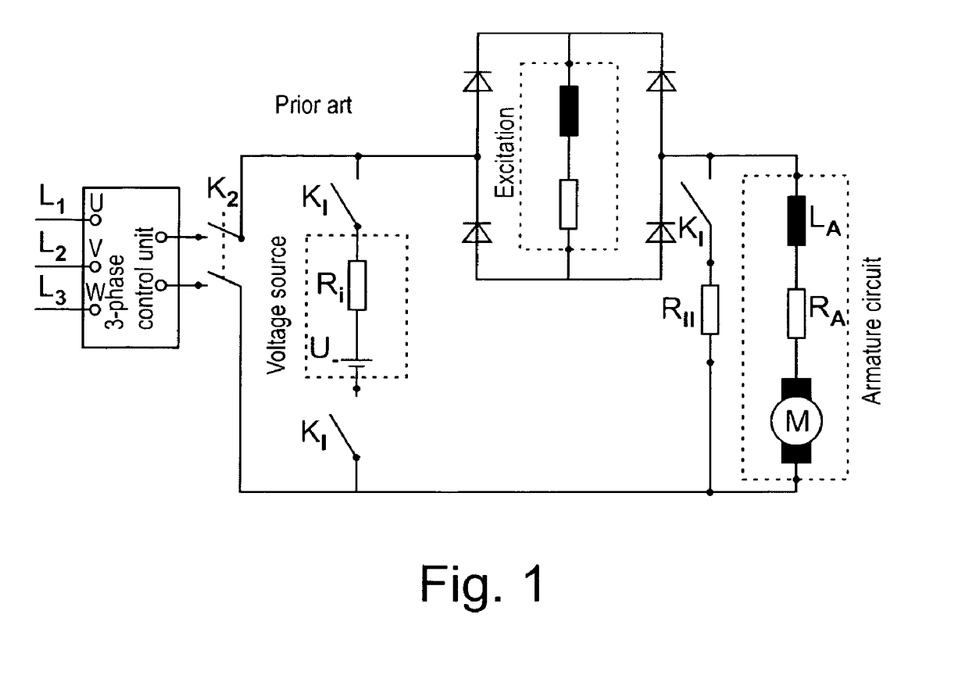
FIG. 1 shows an example of a typical activation circuit for a pitch drive having field rectifier.

FIG. 1 shows an example of a typical activation circuit of a wind power facility's pitch-drive series-wound motor, which can be fed with both three-phase line current and also with direct current by an accumulator. To achieve a rotational direction reversal of the series-wound motor, the exciter winding is wired with a bridge rectifier as a field rectifier. A parallel load resistor $R_{II}$ is connected in parallel to the armature circuit, so that even in the event of decreasing current through the armature winding or, for example, in the event of a defect of the armature circuit, a minimum current flows through the exciter winding and maintains the exciter magnetic field.

Figure 2:
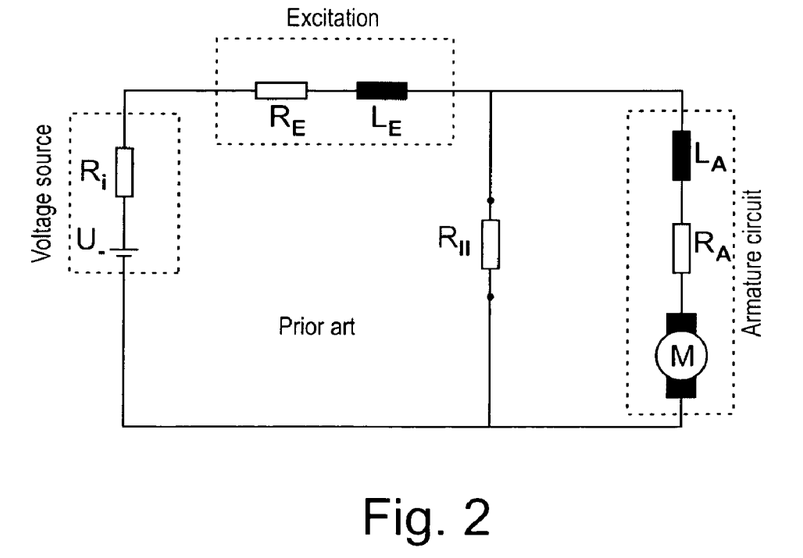
FIG. 2 shows an example of a basic circuit of an activation circuit of a typical pitch-drive series-wound motor.

FIG. 2 shows an example of the basic configuration of an activation circuit of a pitch-drive series-wound motor.

Figure 3:
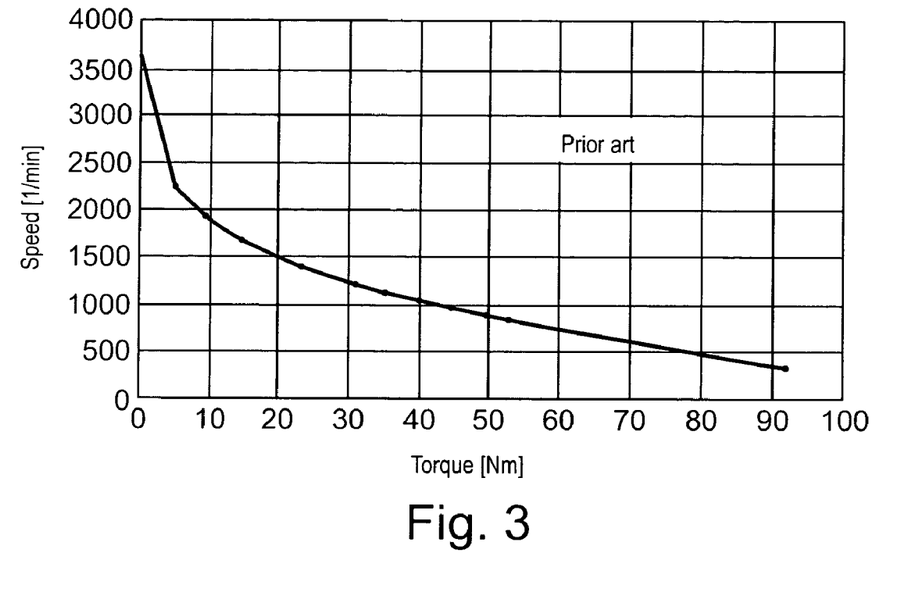
FIG. 3 shows a diagram of the speed dependency on the torque in the activation circuit according FIGS. 1 and 2.

FIG. 3 shows an example of the speed behavior of the series-wound motor according to the basic configuration of the activation circuit according to FIGS. 1 and 2. If the torque of the series-wound motor decreases, for example, in idle or due to an external torque, so that the motor passes from motor operation to generator operation, the speed increases asymptotically in the direction of decreasing torque and grows beyond all limits. This is referred to as "running away" of the motor and typically results in self-destruction of the motor.

The typical activation circuit shown in FIG. 1 comprises a normal operation voltage source, such as a three-phase control device, which obtains DC voltage from three-phase line voltage, and assumes the power supply of the series-wound motor in the event of closed switch K2. For example, if the network fails, an emergency operation voltage source supplies the series-wound motor in emergency operation by turning on the switch K1 and opening the switch K2. A field rectifier implemented by four diodes causes the current flow to always run in the same direction through the exciter winding independently of the polarity of the supply voltage source, so that the orientation of the exciter magnetic field $\psi$ is independent of the current flow through the motor. However, the current flow I through the armature winding changes due to a reversed polarity, so that the torque $$M = \psi \times I \; [\text{Nm}]$$

(with $\psi$ as the magnetic flux of the exciter winding and I as the armature current) also reverses upon reversal of the polarity of the voltage source. A multi-quadrant operation of the series-wound motor is thus possible. Without a field rectifier, in the event of a reversal of the supply voltage, there would be both a reversal of the exciter magnetic field $\psi$ and also of the armature current I, whereby the direction of the torque remains constant.

The load resistor $R_{II}$ shown switched in parallel to the armature winding in FIG. 1 ensures that even if no current flows in the armature of the motor, an exciter current is maintained by the resistor and thus an exciter field is generated which, according to the equation:

$$U_{ind} = \psi \times \omega \; [\text{V}]$$

(with $\omega$ as the rotational frequency of the motor), results in an induced voltage $U_{ind}$ in the armature. Even if there is no fault, the induced armature voltage $U_{ind}$ ensures a stationary limited speed in case of idle of the series-wound motor.

During an idle, the machine has to apply a friction torque caused by bearing friction or connected gears and/or fans. Therefore, during the idle, the exciter current is divided into a base load current, caused by the load resistor $R_{II}$, and a speed-dependent armature current.

However, the activation circuit of a pitch-drive series-wound motor such as shown in FIG. 1 has a significant disadvantage at generator torques, e.g., upon external drive of the motor, in the event of the occurrence of a high wind load on the rotor blade. If an increase of the speed arises, for example, by external drive of the motor, the armature current drops. In principle, the excitation of the machine thus also drops, which results in a reduction of the induced voltage. A further increase of the speed has the result that the motor passes into the generator state, such that the armature current reverses. This occurs if the induced voltage in the armature becomes greater than the potential on the parallel resistor $R_{II}$. In this case, the induced current results in a decrease of the current of the voltage source. If the current induced in the armature increases further, the armature generator assumes the complete supply of the parallel resistor $R_{II}$ and the battery current goes to zero, or even becomes negative. A negative battery current results in an undesired strain and/or uncontrolled charge of the voltage source, which decreases the service life of the battery or the accumulator.

If the dimension of the voltage induced in the armature corresponds precisely to the voltage of the voltage source, current no longer flows through the exciter coil. The magnetic exciter field in the motor thus goes to zero, so that the induced voltage also goes to zero and the known result of "running away" of the machine is thus obtained. A generator load on a series-wound motor according to the known activation also results in "running away" and possibly the self-destruction of the motor. In practice, this has the result that a generator drive of a series-wound motor is only possible in very limited exceptional cases in spite of parallel load resistor $R_{II}$, because the mechanically critical limiting speed is usually reached according to the above-mentioned reasons, and the motor is thus damaged.

In addition to recognizing this problem, the present inventors have also recognized that this problem can be addressed, in an example, by providing a wind power facility having activation circuit for a pitch-drive series-wound motor which has the goal of allowing a speed-limited operation even in the case of a generator drive of the pitch-drive series-wound motor. The present inventors have also recognized the desirability of protecting the voltage source from induced motor voltage. The present inventors have also recognized the desirability of lengthening the service life of accumulators and/or batteries which are used for the emergency operation of the series-wound motor. Further, the present inventors have also recognized that, by modifying an activation circuit without requiring substantial additional component outlay, an activation circuit can be provided for series-wound motors which provides similar properties as a compound-wound machine, and this can be done in a manner that is both cost effective and technically reliable.

The present inventors have described an example of a present wind power facility having an activation circuit for speed-limited and voltage-source-protective operation of a pitch-drive series-wound motor at generator torques. A series-wound motor can include an armature winding and an exciter winding that are connectable separately from one another. A load resistor, $R_{II}$, can be switched essentially in series to the exciter winding and in parallel to the armature winding. A voltage source can include a battery or an accumulator. The load resistor $R_{II}$ can be connected using a first terminal contact to a first terminal contact of the exciter winding and using a second terminal contact to a second terminal contact of the armature winding. The activation circuit can include a first terminal contact of the armature winding that can be connected via a first power converter component to a first terminal contact of the exciter winding. The first terminal contact of the armature winding can be further connected via a second power converter component to a second terminal contact of the exciter winding. The first power converter component can be wired in such a way that it transmits in motor operation and blocks in generator operation. The second power converter component can be wired in such a way that it transmits in generator operation and blocks in motor operation. The voltage source can be connected between the second terminal contact of the exciter winding and a second terminal contact of the armature winding.

Thus, in an example, the present activation circuit can comprise an armature winding that can be activated independently of the exciter winding. The activation circuit can include two power converter components, which each only transmit the current in one direction and block it in the other direction. A load resistor can be switched in parallel to the armature winding and in series to the exciter winding in motor operation. However, in an example of generator operation, the load resistor can be only connected in series to the exciter winding. In normal operation, the current flows through the exciter winding via the first power converter component into the armature winding connected in series and parallel thereto through the load resistor $R_{II}$ back to the voltage source. However, if the motor is externally driven by a generator load and voltage is thus induced in the armature winding, so that the voltage of the armature winding predominates in relation to the voltage via the load resistor $R_{II}$, the first power converter component blocks and the armature-induced current flows via the second power converter component through the exciter winding and the load resistor $R_{II}$ connected in series thereto, so that the direction of the current flow in the exciter winding remains constant.

This circuit configuration has the result that even in generator operation, a current flow in the exciter winding and thus the exciter magnetic field in the same direction are maintained, so that the motor may be inhibited or prevented from running away. It can be especially advantageous that only two additional power converter component elements can allow generator operation of the series-wound motor. Only the parallel resistor $R_{II}$ is decoupled from the armature of the machine by a power converter component element (first power converter component), and the armature of the machine is connected via a feedback power converter component element (second power converter component) to the voltage source side of the exciter winding. In motor operation, the current flows from the voltage source via the exciter winding and is then divided into a resistor current through the load resistor $R_{II}$ and an armature current via the first power converter component through the armature winding. In generator operation, when the induced voltage in the armature predominates, the first power converter component blocks and the induced current flows via the second power converter component in the direction of the original current flow through the exciter winding and through the load resistor R2 connected in series to the exciter winding back to the armature winding. The present activation circuit can thus help to maintain the exciter magnetic field even if the motor has passed into generator operation.

The power converter components can help transmit current in only one direction. Power diodes can be advantageously used for at least one power converter component, but usually for all power converter components, which can absorb the current of the armature winding and/or exciter winding in the transmission direction and withstand the occurring blocking voltage without breakdown in the blocking direction.

However, it can advantageously also be possible that at least one power converter component is an active switching element, in particular a thyristor, transistor, contactor, or similar element, which can be switched as a function of the operating behavior of the motor. Such an example typically provides, at least for unipolar components, a controller, which establishes the operating case of the series-wound motor and switches the power converter component as a function of the established operating mode.

If a unipolar switching element, such as a contactor or a transistor, is used as the power converter component instead of a power diode, it can be advantageously possible for the activation circuit to also comprise an armature current measuring device for judging the operating behavior of the motor, which can be used to control the power converter component. Using an armature current measuring device, the direction of the current flow in the armature is thus measured, and it can thus be judged whether motor or generator operation exists. After establishing the operating case, the power converter components can be switched accordingly.

Furthermore, it can be advantageous in the case of unipolar power converter components if the armature current measuring device is connected to an operating mode control device, which establishes a motor or generator operating mode as a function of the measured data of the armature current measuring device and switches the first and second power converter components as a function of the operating mode. Such an operating mode control device can include a microcontroller, an operating computer, or a similar device, for example, and can perform other motor-relevant control tasks, such as controlling the rated voltage of the voltage source or similar tasks, in addition to the control of the power converter component.

The power converter components can comprise, as described above, a component for establishing a desired current direction, for example, made of diodes or active switching elements. In an example, it can be highly advantageous if at least one power converter component also comprises an overcurrent or overvoltage protection component and/or a current or voltage measuring component. An overcurrent or overvoltage protection component monitors the current flow through or the voltage via the path of the power converter component and can disconnect the path in the event of excessive currents or voltages (also blocking voltages), e.g., protect the power converter component. In addition, a current or voltage measuring component can measure the currents and voltages in the path of the power converter component and provide a conclusion about the operating state of the wind power facility and in case of emergency, e.g., if a critical value is exceeded, trigger an emergency disconnection. In an example, the current or voltage protection element and measuring element can be combined.

An accumulator, a battery, or a similar device comes into consideration as the voltage source in particular in emergency operation. To increase the service life of such a DC voltage source, it is also advantageously possible to connect a power converter component upstream from the voltage source, so that it is in series to the voltage source. The further power converter component inhibits or prevents current from flowing back into the voltage source in generator operation. Using such a further power converter component, the voltage source can be effectively protected from undesired charging currents by the generator operation of the series-wound motor.

If exciter and armature windings are connected in series, operation of the series-wound motor is fundamentally only possible in one direction even if the voltage source is commutated. The present activation circuit can therefore advantageously be supplemented by a field rectifier, which switches the exciter winding using a bridge rectifier circuit, so that the exciter current always flows in the same direction independently of the polarity of the voltage source. Right/left hand running of the motor is thus possible by reversing the polarity of the voltage source.

The area of application of the wind power facility having the present activation circuit can be in the operation of a pitch motor that moves the blade of a wind or water power facility, so that the attack angle of the rotor blade can be changed in relation to the flowing medium (e.g., wind or water), such as using the series-wound motor. In this way, the operational reliability of the pitch regulator system can have high priority, because the control of the attack angle of the rotor blade significantly influences the operation of the power facility. The activation circuit is advantageously wired in normal operation, in which the rotational direction may be switched over, using a normal operating voltage source so that the bridge rectifier is connected between normal operating voltage source and exciter winding, and is switched in emergency operation, in which the rotational direction is fixed, so that the diodes of the bridge rectifier, as the first and second power converter components, connect an emergency operation voltage source to the exciter winding, the armature winding, and the load resistor $R_H$. This wind power facility thus implements an activation circuit having field rectifier in normal operation, e.g., in operation using a normal operating voltage source, and in emergency operation, by reversed powering of the field rectifier at the terminal poles of the exciter winding, the diodes of the bridge rectifier can be used for the purpose of assuming the function of the power converter components. In such an example, the activation circuit thus behaves in normal operation like a typical activation circuit and in emergency operation like the present activation circuit. This has the advantage that a typical activation circuit having field rectifier can use modification of the feed points of the emergency operation voltage source to obtain the present an activation circuit without requiring additional components.

If the wind power facility having activation circuit for a pitch drive is equipped with two different voltage sources, the emergency operation voltage source and the normal operation voltage source, it can be especially advantageous to provide at least one switching element, which switches over between normal operation, in which the rotational direction may be switched over, using a normal operation voltage source and emergency operation, in which the rotational direction is predefined, using an emergency operation voltage source. The first or second power converter component can supply the exciter winding in motor and/or generator operation with current in a constant direction at least in emergency operation. In this way it is possible to separate the normal operating state completely from the emergency operating state of the activation circuit, so that the two different operational types can be implemented independently of one another.

If the at least one switching element described above is used for switching over between normal operation and emergency operation, it can also be advantageous for the load resistor to be switched in series to the exciter winding and parallel to the armature winding by a switching element, at least in emergency operation. Current can thus be saved and high startup torques can be achieved in normal operation, and the regulation of the series-wound motor can be controlled with the aid of the normal operation voltage source, while in emergency operation the parallel load resistor can be switched in, such as to inhibit or prevent the motor from running away in the generator case.

DETAILED DESCRIPTION

FIG. 1 shows a typical activation circuit for a pitch-drive series-wound motor of a wind power facility, which comprises a field rectifier. The series-wound motor is either supplied by a line voltage source in the form of a three-phase control device or by an emergency operation voltage source. The three-phase control device receives the three line phases of the three-phase network and converts them into a DC voltage for operating the series-wound motor. It is used as a normal operation voltage source, which is activated when the contactor K2 is closed. In this case, the contactor K1 remains open, and the emergency operation voltage source, which may be a battery or an accumulator, for example, thus remains separated from the activation circuit. In case of malfunction, for example, in the event of breakdown of one or more line phases, the contactor K2 opens and disconnects the activation circuit from the normal operation voltage source, and the contactor K1 closes, and thus supplies the activation circuit with energy via the emergency operation voltage source. The emergency operation voltage source comprises a DC voltage source $U_=$ and an internal resistor $R_i$. The voltage source delivers its voltage to the exciter winding, which is wired in series with the armature circuit. A load resistor $R_{II}$ is connected in parallel to the armature circuit. The exciter winding, which may be represented as an equivalent circuit diagram by series connection of an ohmic load resistor $R_e$ and an inductor $L_e$, is wired with a field rectifier wired as a bridge rectifier. This causes current to always flow through the exciter winding in the same direction, independently of the polarity of the voltage source, and the exciter magnetic field thus to always be oriented identically. After the current has flowed through the exciter winding, it is divided into a load current through the load resistor $R_{II}$ and an armature current through the armature winding, which may in turn be represented as an equivalent circuit diagram by a series connection of an inductor $L_a$ and an ohmic resistor $R_a$.

FIG. 2 shows an operating state of the activation circuit shown in FIG. 1. FIG. 2 corresponds to the emergency operation of the circuit shown in FIG. 1, e.g., operation using closed contactor K1 and open contactor K2. The emergency operation voltage source, which comprises DC voltage source $U_=$ and internal resistance $R_i$, is switched in series with the exciter winding, which comprises an inductor $L_e$ and an internal resistor $R_e$, and is followed by the parallel circuit made of load resistor $R_{II}$ and armature circuit, comprising the ohmic resistor $R_a$ and the inductor $L_a$. The current delivered by the voltage source flows through the exciter winding and generates an exciter magnetic field, and is then divided into a current through the load resistor $R_{II}$ and an armature current through the armature circuit. In idle, the current through the armature circuit decreases, so that the exciter magnetic field is primarily generated by the current of the load resistor $R_{II}$.

FIG. 3 shows the behavior of the speed of the series-wound motor if the activation circuit of a wind power facility according to FIG. 2 is used during decreasing load torque. At a high load torque, for example, 90 Nm, the speed is approximately 400 rpm. If the load torque decreases, the speed increases quasi-exponentially, and at disappearing load torque, i.e., in an ideal idle, the speed rises past all limits, which finally results in destruction of the motor. This situation is remedied in the prior art in that the load resistor $R_{II}$ switched in parallel to the armature circuit allows a base current through the exciter winding even in the event of unpowered armature circuit, and thus operates the motor in a speed-limited way at least in the event of low load torques. However, the load resistor $R_{II}$ switched in parallel also cannot prevent the phenomenon of "running away" of the motor described at the beginning from occurring during generator operation of the series-wound motor, i.e., an external drive of the motor shaft and an increase of the speed thus externally forced.

Figure 4:
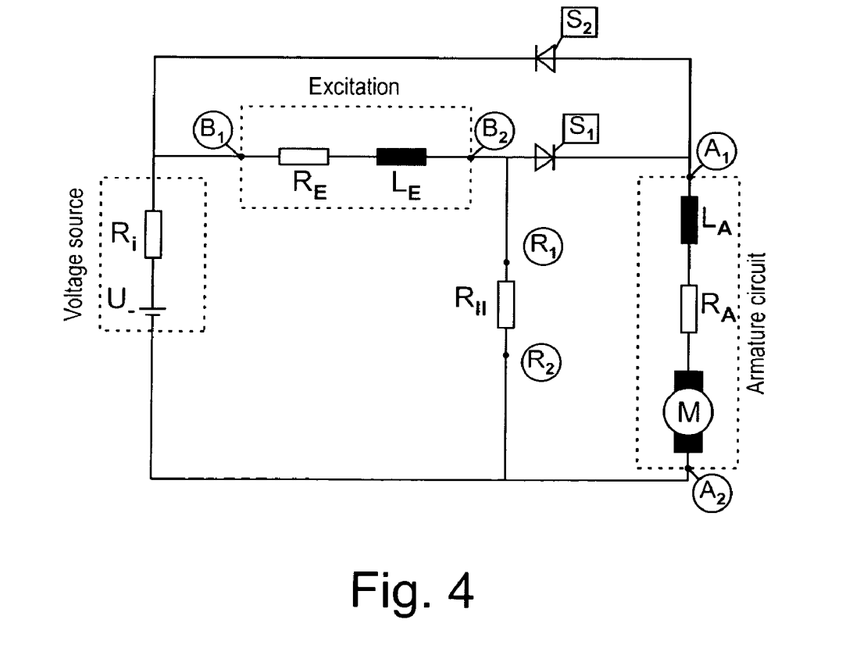
FIG. 4 shows an example of the present activation circuit.

FIG. 4 shows an example of a wind power facility including a first example of the present activation circuit for a pitch-drive series-wound motor. In the basic circuit shown in FIG. 4, the series-wound motor can be supplied with power by an emergency operation voltage source, which can comprise a DC voltage source $U_=$ and an internal resistor $R_i$. In motor operation, e.g., in normal operation, the current first flows through the exciter winding from the voltage source through a second terminal contact E2 into the exciter winding and exits at a first terminal contact E1. The exciter current is then divided in a load resistor $R_{II}$ switched in parallel to the armature circuit, and flows through the first terminal contact R1 of the load resistor into the load resistor and exits at the second terminal contact R2. A second part of the exciter current flows from the first terminal contact of the exciter winding E1 via a power converter component S1 to the first terminal contact of the armature winding. It enters the armature circuit there, which comprises an internal resistor $R_a$ and an inductor $L_a$, and exits at the second terminal contact of the armature winding A2. At this point, the armature current is unified with the current coming from the load resistor $R_{II}$ switched in parallel and flows back to the voltage source. The first power converter component S1 is thus switched in the transmission direction in motor operation. Furthermore, a second power converter component S2 is switched from the first terminal contact A1 of the armature circuit to the second terminal contact E2 of the exciter winding and thus directly to the terminal contact of the voltage source. This second power converter component is switched in the blocking direction in motor operation.

During the motor operation, the current thus flows through the exciter winding to the armature and is divided there, as in the activation circuit known from the prior art, into a resistor current and a torque-producing armature current. Essentially the terminal voltage of the battery is applied to the parallel resistor $R_{II}$, because the exciter winding is typically low resistance. It is only reduced by the voltage drop at the series-wound resistor of the exciter winding. As torques become larger, the current through the series-wound winding increases. The voltage drop at the series-wound winding thus also increases, so that in the event of greater torques, the voltage at the parallel resistor $R_{II}$ decreases in relation to the battery voltage. This decrease is reinforced still further by the internal resistor $R_i$ of the voltage source. The current through the parallel resistor $R_{II}$ thus decreases as torques become larger. If the machine now approaches the idle, the battery current decreases ever further, whereby the excitation of the machine also decreases. In the ideal idle case, the armature current is zero and the excitation of the machine is only still determined by the current of the parallel resistor. Up to idle, the behavior of the activation circuit can correspond to the behavior of the activation circuit of FIG. 1 or 2.

If the speed of the machine is now increased further, e.g., if the series-wound motor is used as a pitch motor to adjust the rotor blade pitch, and displaces the blade into a vertical position, this results in a further increase of the induced voltage in armature circuit with initially constant excitation of the excitation circuit. The current in the armature then changes its direction, whereby the power converter component S2 becomes conductive and the power converter component S1 passes into the blocking state. The current generated in the armature is divided in a path through the voltage source and a path through the exciter winding and the parallel load resistor $R_{II}$ and flows back to the armature circuit. The potential at the parallel resistor is, due to the drop at the series-wound winding, initially less than the potential of the voltage source, the generator armature current thus initially takes the route via the load resistor $R_{II}$. The current in the parallel resistor remains nearly constant, which results in a decrease of the battery current. In this situation, the supply of the parallel resistor changes, from the battery to the armature. In contrast to a more typical activation circuit, however, this does not result in a decrease of the excitation. The excitation remains nearly constant, because the resistance current remains constant. In the event of sufficiently high generator load, the armature current completely takes over the supply of the parallel resistor $R_{II}$ and the battery current goes to zero. As soon as a negative armature current occurs, the machine is in the generator state. The resulting generator power is absorbed in this period of time by the parallel resistor $R_{II}$ and the voltage source is not charged, e.g., the battery or the accumulator. A current flow only occurs in the battery if the generator torque is increased further. The current in the resistor remains quasi-constant. As a result, the machine is capable of capturing generator torques without entering overspeed. Generator current peaks may be more or less prevented. If accumulators are used in the activation circuit, in particular during operation in a pitch system, they are protected. Starting from the activation circuits known from the prior art, only two further power converter components, e.g., diodes, can be included.

Figure 5:
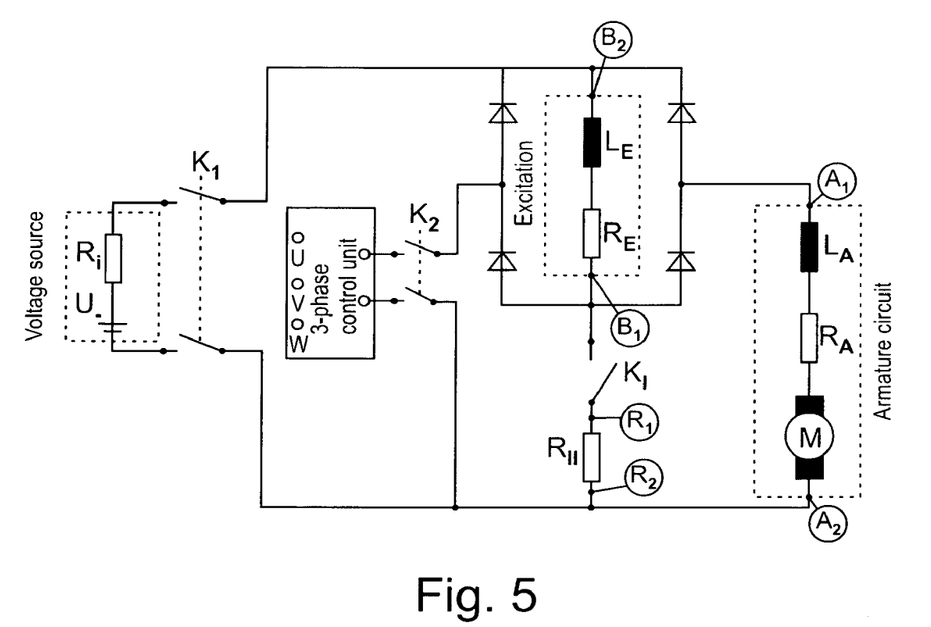
FIG. 5 shows a second example of the present activation circuit having a field rectifier.

To advantageously integrate the circuit variants of FIG. 4 described above in a pitch system of a wind power or water power facility, an implementation like the embodiment shown in FIG. 5 can be used. A typical activation circuit, such as shown FIG. 1, can be modified in FIG. 5 in such a way that the present activation circuit can be implemented. The activation circuit according to FIG. 5 can be operated in normal operation by a normal operation voltage source, in this case by a three-phase control device. For this purpose, the contactor K2 is closed and the contactor K1 is opened. In normal operation, the three-phase control device supplies the activation circuit with current, the current in the exciter winding through a field rectifier, which, among other things, comprises the diodes S1, S2, supplying the exciter winding pole-independently in such a way that even upon commutation of the voltage source, the magnetic exciter field remains oriented directionally constant. After the current has flowed through the exciter winding and the field rectifier, it flows through the armature circuit back to the three-phase control device. In case of malfunction, e.g., in emergency operation, the contactor K2 is opened and the contactor K1 is closed. An emergency operation voltage source, such as a DC voltage source like an accumulator or battery, is thus switched in. Furthermore, the load resistor $R_{II}$ is switched in series to the exciter winding and parallel to the armature circuit. The current of the emergency operation voltage source flows in the DC voltage side of the field rectifier, in contrast to operation using normal operation voltage source, and thus supplies the exciter winding and the load resistor $R_{II}$ connected in series therewith with current directly. The voltage source is further coupled via the diode S2 and via the exciter winding and the diode S1 with the armature circuit. The two remaining diodes of the bridge rectifier are nonfunctional in this case, because they are switched in the blocking direction in relation to the polarity of the emergency operation voltage source.

Therefore, starting from the activation circuit shown in FIG. 1, the present activation circuit can be implemented without requiring additional components, such as by an only slightly altered activation of the field rectifier by the emergency operation voltage source connected to the DC voltage side. This offers the possibility of setting the machine in the generator operating state, and preventing self-destruction of the machine.

The torque speed and the characteristic of the series-wound machine may be influenced arbitrarily by the selection of the dimension of the load resistor. However, the relatively high lost power occurring at the load resistor $R_{II}$ can be considered. The operating range in which the arriving power may be absorbed by the load resistor $R_{II}$ results in an active protection of the accumulators, because high charging currents can be inhibited or prevented. The size of this operating range can also be fixed by the dimensioning of the load resistor. In the remaining generator range, the high charging currents of the accumulator are each reduced by the current of the parallel resistor. In an industrial 216 V system, the circuit variants can be implemented without additional hardware outlay. The system can provide a higher reliability than alternative compound-wound systems, because a lower number of contactors can be used, and the danger of a wire break in a shunt-wound winding, which typically results in overspeed in shunt-wound machines, can be dispensed with. Furthermore, no complex effects occur in the present connection circuit, as in a compound-wound machine. Finally, the present connection circuit can be distinguished by a very low cost and implementation outlay.

Figure 6:
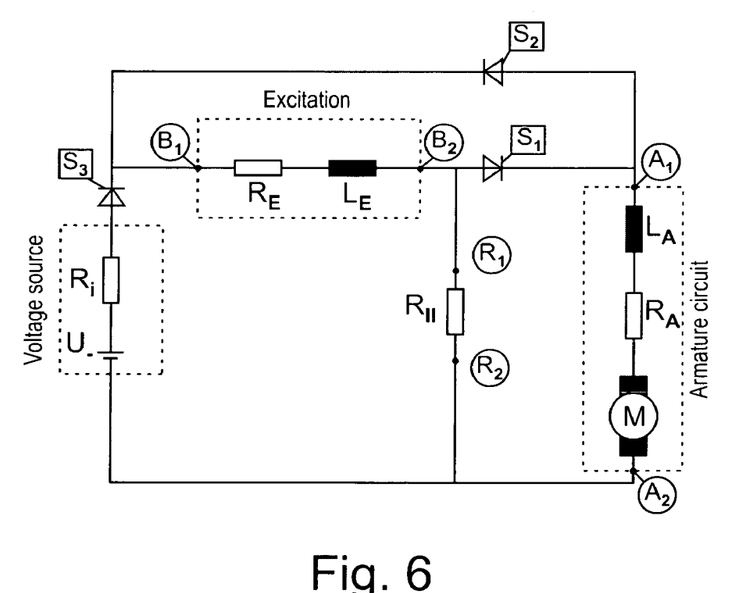
FIG. 6 shows a third example of the present activation circuit.

A modification of the example embodiment shown in FIG. 4 is shown in FIG. 6: in addition to the two rectifier components S1 and S2, which are implemented as diodes, a third diode S3 can be installed to protect the emergency operation voltage source. This protects the voltage source from generator currents, which can result in the destruction of the voltage source with batteries. The diode S3 can be switched in series to the emergency operation voltage source and only permits an active current flow of the voltage source.

Figure 7:
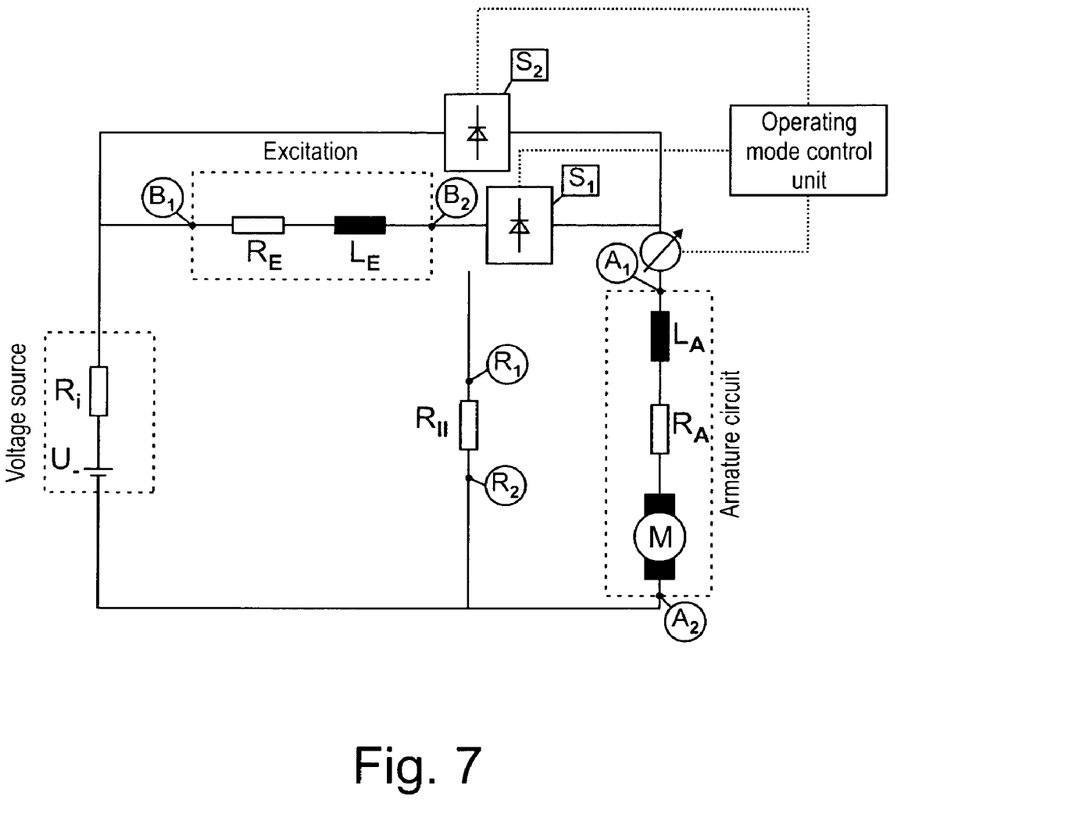
FIG. 7 shows a fourth example of the present activation circuit.

Finally, a fourth example embodiment of the present activation circuit is shown in FIG. 7. This example expands the present concept, proceeding from the example embodiment shown in FIG. 4, in that one or both of the two power converter components S1 and S2 can be implemented by an active switch element, such as a transistor, thyristor, contactor, or similar element, instead of by a diode. The power converter components can also contain, in addition to the active switch elements, power or voltage monitoring units and/or protective units such as measuring instruments, fuses, etc. The control of the active switch elements can be performed by an operating mode control device. For this purpose, a current measuring unit can be included in the armature circuit, which measures the armature current flowing to or from the first terminal contact A1 of the armature circuit. The operating mode control device can establish the operating mode of the series-wound motor with the aid of the armature current measured by the current measuring unit, e.g., motor operation in the event of positive current and generator operation in the event of negative current, and switched the two power converter components S1, S2 accordingly as a function of the operating state. In normal operation (motor operation), the power converter components S1 transmits and the power converter component S2 (generator operation) blocks. Current thus flows from the voltage source via the exciter winding to the load resistor $R_{II}$ and via the power converter components S1 through the armature circuit. If generator current flows in the armature circuit, the power converter component S1 is opened and the power converter component S2 is closed, so that the induced current of the armature circuit can flow back to the armature circuit via the exciter winding and the load resistor to maintain the exciter magnetic field. Through such an implementation, it is possible to implement an example of the present concept even on motors in which typical diodes may not be used because of the terminal currents and voltages.

The invention claimed is:

1. An apparatus comprising:
a wind power facility comprising:
an activation circuit for a speed-limited and voltage-source-protective operation, at one or more generator torques, of a pitch-drive series-wound motor comprising an armature winding and an exciter winding that are connectable separately from one another;
a load resistor, which is switched essentially in series to the exciter winding and parallel to the armature winding, so that it ensures a minimum exciter current in motor operation, the load resistor being connected using a first terminal contact to a first terminal contact of the exciter winding and using a second terminal contact to a second terminal contact of the armature winding; and
a voltage source, comprising a battery or accumulator; and
wherein the first terminal contact of the armature winding is connected via a first power converter component to the first terminal contact of the exciter winding and to the first terminal contact of the load resistor, and
wherein the first terminal contact of the armature winding is connected via a second power converter component to the second terminal contact of the exciter winding, and
wherein the first power converter component is configured to transmit in motor operation and block in generator operation, and
wherein the second power converter component is configured to transmit in generator operation and block in motor operation, and
wherein the voltage source is switched between the second terminal contact of the exciter winding and a second terminal contact of the armature winding.

2. The apparatus of claim 1, wherein at least one power converter component comprises a power diode.

3. The apparatus of claim 1, wherein at least one power converter component comprises an active switch element that is switched as a function of operating behavior of the motor.

4. The apparatus of claim 3, wherein the activation circuit comprises an armature current measuring device configured for judging the operating behavior of the motor, and wherein the operating behavior of the motor is used to control the power converter component.

5. The apparatus of claim 4, wherein the armature current measuring device is connected to an operating mode control device that establishes a motor or generator operating mode as a function of the measured data of the armature current measuring device, and wherein the first and second power converter components are switched as a function of the operating mode.

6. The apparatus of claim 1, wherein at least one power converter component comprises at least one of an overcurrent detection component, an overvoltage detection component, a current measuring component, or a voltage measuring component.

7. The apparatus of claim 1, wherein the voltage source comprises a third power converter component that is switched in series to the voltage source, and that prevents current from flowing back into the voltage source in generator operation.

8. The apparatus of claim 1, wherein the exciter winding is configured with a bridge rectifier used as a field rectifier.

9. The apparatus of claim 8, wherein the bridge rectifier is switched in normal operation, in which the rotational direction is capable of being switched over, between a normal operation voltage source and the exciter winding, and
wherein the bridge rectifier is switched in emergency operation, in which the rotational direction is predefined, in such a way that diodes of the bridge rectifier, comprising the first and second power converter components, connect an emergency operation voltage source and the exciter winding to the armature winding.

10. The apparatus of claim 1, comprising at least one switch element that switches over between normal operation, in which the rotational direction is capable of being switched over using a normal operation voltage source, and emergency operation, in which the rotational direction is predefined, using an emergency operation voltage source; and
wherein at least one of the first or second power converter component is configured for supplying the exciter winding with power in motor or generator operation, respectively, at least in emergency operation.

11. The apparatus of claim 1, wherein the load resistor is configured to be switched in series to the exciter winding and in parallel to the armature winding by a switch element at least in emergency operation.

* * * * *